Feb. 5, 1924.

J. H. SMITH

CHAIN CONNECTER

Filed Oct. 11, 1922

1,482,664

Inventor
J. H. Smith.
By
Attorney

Patented Feb. 5, 1924.

1,482,664

UNITED STATES PATENT OFFICE.

JOHN H. SMITH, OF DENTON, NEBRASKA.

CHAIN CONNECTER.

Application filed October 11, 1922. Serial No. 593,740.

*To all whom it may concern:*

Be it known that I, JOHN H. SMITH, a citizen of the United States, residing at Denton, in the county of Lancaster and State of Nebraska, have invented certain new and useful Improvements in a Chain Connecter; and I do hereby declare the following to be a full, clear, and exact description of the invention, such as will enable others skilled in the art to which it appertains to make and use the same.

The invention relates to means for connecting parts, such as the ends of a chain, being designed specifically for use in connection with tire chains for securing the ends thereof when applied to the wheel.

The invention provides a connecter which will not open or accidentally release when in operation either when reversing or by coming in contact with objects such as stones or other road obstructions usually tending to release tire chains.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the specification,

Corresponding and like parts are referred to in the following description and designated in the several views of the drawing by like reference characters.

Figure 1:
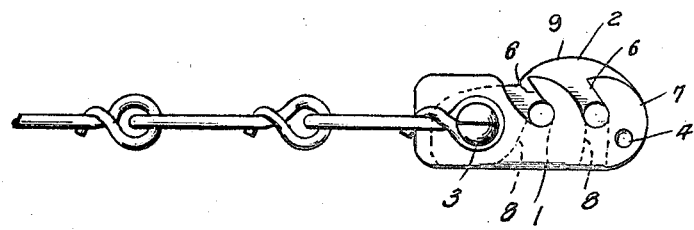
Figure 1 is a side view of a chain connecter illustrative of the invention.
Figure 2:
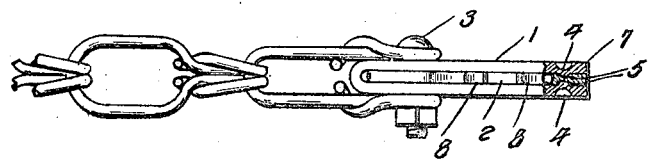
Figure 2 is an edge view thereof parts being broken away to show more clearly the interlocking means between the cooperating members comprising the connecter.
Figure 3:
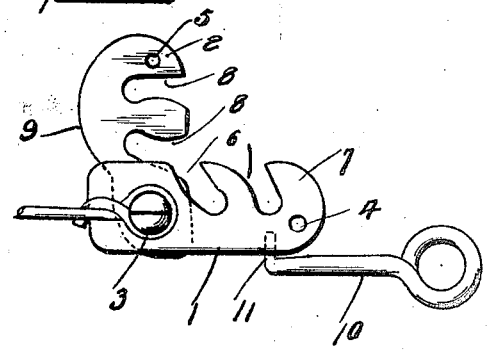
Figure 3 is a side view of the connecter with the key in position and the lock member released and swung into open position.
Figure 4:
Figure 4 is a detail view of the key.

The connecter comprises a hook member 1, and a cooperating lock member 2, the two members being pivotally connected at one end by means of a bolt 3 or like fastening. The hook member 1 comprises like parts which are connected at one end and adapted to be sprung apart at the opposite end. The two parts are spaced to snugly receive between them the lock member 2. Interlocking means are provided between the members 1 and 2 to prevent their casual separation when in operative position. The interlocking means consists of projections 4 and recesses 5 which may be provided in any manner the projections 4 being upon one of the members and the recesses 5 upon the other member. As shown the projections 4 are pressed inwardly from the parts comprising the hook member 1 and the recesses 5 are formed in the lock member 2. The parts comprising the hook member 1 may be connected at one end in any manner. In the preferable construction the hook member 1 is formed from an elongated blank which is doubled or folded upon itself to provide the two parts between which the lock member 2 is received. The hook member 1 is preferably provided along one edge with a plurality of notches 6 to provide the engaging elements 7 to receive the end of the chain or other part to be connected. The lock member 2 is provided along the opposing edge with corresponding notches 8 in registering position with the notches 6 whereby to form openings between the two members 1 and 2 for receiving the parts to be connected. The outer or opposite edge of the lock member is humped or outwardly deflected as indicated at 9 to form a guard to prevent the extremities of the engaging element 7 from coming in contact with any objects which would tend to open the connecter. When the members 1 and 2 are in closed position the projections 4 fit in the recesses 5 thereby securing the lock member and preventing its casual opening and the release of the parts connected with the probable loss of the chain as frequently occurs. To release the lock member 2 it is necessary to press the part of the hook member 1 a distance apart to disengage the projections 4 from the recesses 5 after which the lock member 2 may be readily swung into open position as indicated more clearly in Figure 3.

For convenience of releasing the lock member 2 a key 10 is provided. This key has a transversely elongated lug 11 which is adapted to be inserted flatwise between the parts of the hook member 1 after which the key is turned into the plane of the connecter to cause the rib 11 to force the parts of the member 1 apart so as to effect disengagement of the cooperating interengaging elements 4 and 5 whereby the release of the lock member 2 is effected.

Having thus described the invention, what I claim is:—

1. A connecter of the character specified comprising a hook member, said hook member consisting of an elongated strip formed into substantially U-shape, a lock member coacting with and pivoted to the hook member in the bifurcation thereof, said hook member and lock member having interengaging projections and recesses at their contacting surfaces, the lock member being resilient, and the construction of the lock member providing a space for insertion of a tool to pry the projections from the notches.

2. A connecter of the character specified comprising a hook member, said hook member consisting of an elongated strip formed into substantially U-shape, a lock member coacting with and pivoted to the hook member in the bifurcation thereof, said hook member and lock member having interengaging projections and recesses at their contacting surfaces, the lock member being resilient, the construction of the lock member providing a space for insertion of a tool to pry the projections from the notches, and the lock member having a portion deflected outwardly beyond the fastening edge of the hook member and substantially uninterrupted from end to end of said portion for the purpose specified.

In testimony whereof I affix my signature in presence of two witnesses.

JOHN H. SMITH.

Witnesses:
 A. O. SKINNER,
 F. W. HILL.